Feb. 7, 1961 K. BÖHM 2,970,621
MEAT MINCING MACHINE
Filed Jan. 13, 1959
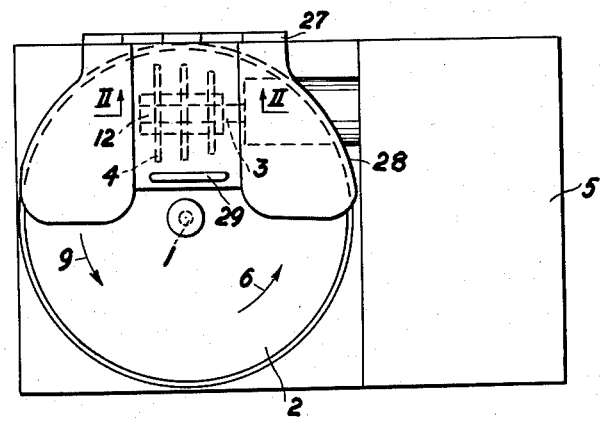
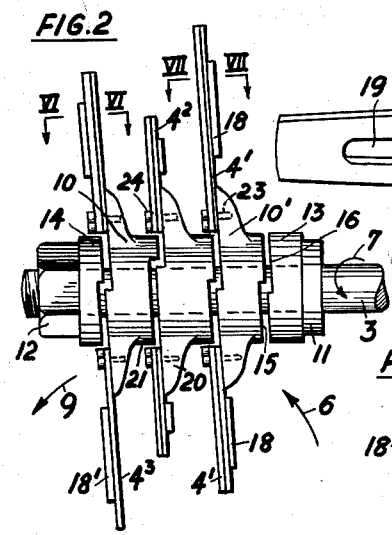
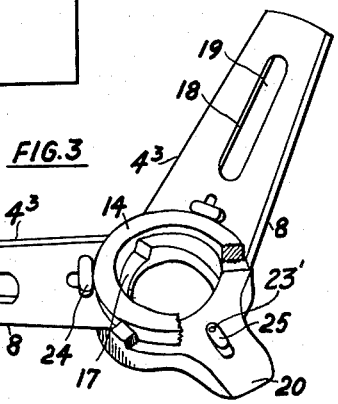
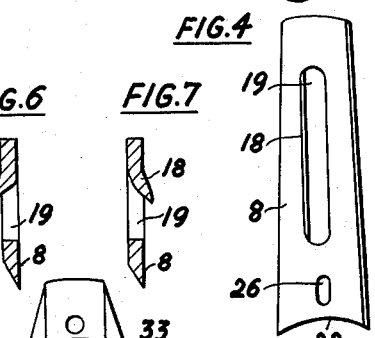
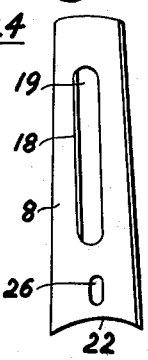
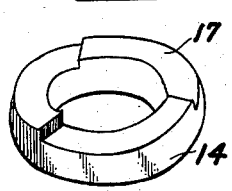
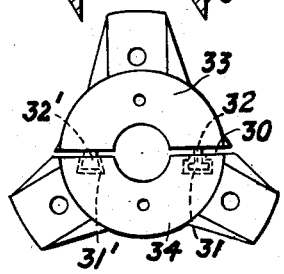
INVENTOR
Karl Böhm
By
Lowry & Rinehart
ATTYS.

United States Patent Office 2,970,621
Patented Feb. 7, 1961

2,970,621

MEAT MINCING MACHINE

Karl Böhm, 109 Sternstrasse, Hamburg 6, Germany

Filed Jan. 13, 1959, Ser. No. 786,573

7 Claims. (Cl. 146—96)

This invention relates to the known meat mincing machines which have a dish rotatable about a veritcal axis and a horizontal knife shaft with knife sets which operate inside the dish about an axis perpendicular to that of the axis of rotation of the dish and which are partly surrounded by a pivotable dish cover, the knife sets being formed from wing-like knives which are secured to hub rings to extend radially outwards with a generally screw-like inclination.

The known machines, or cutters, of this type for meat mincing have various deficiencies and operate with very low efficiency. The material to be minced heats up and therefore ice must be added. There is no rapid and powerful mixing together of the material to be minced. The arrangement of the knives requires to be very long in the axial direction, and maintenance and repair of the knives are difficult. Exchange and adjustment of the knife sets is not possible. The knife sets must be fixed to the knife shaft by means of a spanner with the use of a wedge or a rectangular or similar profile, and the hub rings to which the knives are secured are expensive to adapt.

The object of the present invention is to provide a meat mincing machine which avoids these disadvantages and in which a knife set can be mounted on, and removed from, a knife shaft with a circular cross section in a very simple manner without the use of wedges.

An important feature of the invention consists in that the meat mincing machine is provided with hub rings to which knife sets are secured and which cooperate with counter-rings as clamping parts in a self-clamping manner between a collar and a nut on a knife shaft having an uninterrupted circular cross section. The knife sets include knives secured to the hub rings to extend radially outwards with a generally screw-like inclination. The hub rings and counter-rings are respectively provided on adjacent faces thereof wih clamping faces which are of stepped screw thread-like form and are supplementary to one another.

In practice, at least the hub ring of the knife set which first meets the material to be minced, and the adjacent counter-ring, have stepped clamping faces which are of such a form that the counter-ring has stepped faces which descend, and the hub ring has adjacent stepped faces which ascend, in the direction of rotation. The result of this construction is that when operation begins there is relative rotation of these two faces by a small amount to give firm clamping of all the knife sets between the collar and the nut, this nut only requiring to be screwed up by hand.

Another feature of the invention consists in that at least one of the hub rings has an outer surface so shaped as to form a holding stop for the inner ends of the knives of an adjacent knife set, and to form a safety member for hammer-headed securing screws for these knives.

Yet another feature of the invention consists in that the knives have longitudinal recesses with angled cutters at the rear edge of these recesses in the direction of rotation of the knives. The angled cutters of all the knife sets except the last set encountered by the material to be minced are directed towards the input side of the material to be minced to effect transport of this material, whereas the angled cutters of the last set are directed in the opposite direction to act as graters and to eject the material.

A preferred embodiment of a meat mincing machine according to the invention is illustrated diagrammatically and by way of example in the accompanying drawing, in which Fig. 1 is a top plan view of a meat mincing machine in which three knife sets are used;

Fig. 2 is an elevational view of the machine on an enlarged scale;

Fig. 3 is a perspective view of the last knife set encountered by material to be minced in the machine, one of the knives being omitted for clarity;

Fig. 4 is an elevational view showing one of the knives;

Fig. 5 is a perspective view of a counter-ring on an enlarged scale;

Fig. 6 is a cross sectional view taken on the line VI—VI of Fig. 2;

Fig. 7 is a cross sectional view taken on the line VII—VII of Fig. 2, and

Fig. 8 is an elevational view showing a two-part hub ring.

Fig. 1 shows a meat mincing machine having a vertical axle 1 about which a dish 2 is rotatable, the machine also including a horizontal knife shaft 3 of uniform circular cross section carrying knife sets 4. A drive member 5 can effect rotation of the dish 2 and the knife shaft 3, the dish 2 rotating in the direction of arrow 6 and the knife shaft 3 rotating in the direction of arrows 7 (Fig. 2). Material to be minced leaves the knife sets in the direction of arrow 9. A hinge 27 carries a dish cover 28, see U.S. Letters Patent 1,488,250, for example, provided with a handle 29 for pivoting the dish cover downwardly to form a housing partly surrounding the knife sets 4.

Fig. 2 shows three knife sets $4^1$, $4^2$ and $4^3$ mounted on the shaft 3, but the number of knife sets can be varied as desired. Each of the knife sets comprises wing-like knives 8 and the individual knife sets are secured to hub rings 10 and one hub ring $10^1$ to extend radially outwards and with a generally screw-like inclination. The knife sets are mounted between a collar 11 and nut 12 on the shaft 3.

The shaft 3 also carries counter-rings 13 and 14 between the collar 11 and the nut 12 and adjacent the collar and the nut respectively. At least the hub ring $10^1$ of the knife set $4^1$ which is encountered first by the material to be minced, and the adjacent counter-ring 13 each have on adjacent faces 15 and 16 respectively several screw thread-like stepped faces 17 which are supplementary to one another and act as clamping faces giving self-clamping of the knife sets. The relative disposition of the stepped faces 17 on the adjacent faces 15 and 16 can be seen quite clearly from Fig. 2: the effect of this construction is that when operation beg'ns there is relative rotation between the hub ring $10^1$ and the counter-ring 13 which causes firm clamping of all the knife sets $4^1$, $4^2$ and $4^3$ between the collar 11 and the nut 12 of the knife shaft 3. The nut 12 only needs to be tightened up by hand, since the small amount of play resulting is taken up by means of a small rotation of the first knife set $4^1$ when the knives are loaded by means of the material to be minced.

Although the foregoing description has only referred to stepped faces 17 on the adjacent faces 15 and 16, and good results are obtainable with such a construction, in the embodiment shown in Fig. 2 each of the hub rings 10 and $10^1$ has two such faces with a stepped construction and the counter-ring 14 also has stepped faces.

As can be seen from Figs. 3, 4, 6 and 7, each of the knives 8 has a longitudinal recess 19, with an angled cutter 18 at the rear edge of each of these recesses in the direction of rotation of the knives. To accelerate the mincing the angled cutters 18 of all the knife sets except the last set encountered by the material to be minced are directed towards the input side of the material to be minced, whereas angled cutters 18¹ of the last knife set 4³ are directed towards the output side.

The screw-like inclination of the knives 8 and the angled cutters 18 ensure rapid passage of material to be minced and simultaneously cool the material without the addition of ice.

To make it possible for the knife sets 4¹, 4² and 4³ to have a small hub diameter and to facilitate the securing of narrow, flat knives, the hub rings 10 have support arms 20. The hub rings have outer surfaces 21 against which inner ends 22 of the knives 8 of adjoining knife sets can bear and surfaces 21 act as safety members for securing screws 23 with hammer heads 24, the hammer heads bearing against the outer surfaces. The counter-ring 14 has this function for the end knife set 4³. The knives 8 can be additionally secured by engagement of recesses 26 therein with holding projections 25 of the hub rings 10. The projections 25 have a threaded bore 23' for receiving the screws 23.

As shown in Fig. 8, it is possible for a hub ring to be divided at a separating plane 30 with axially directed guide grooves 31 and 31¹, rectangularly undercut and dove-tailed in cross section, respectively, and projections 32 and 32¹.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What I claim is:

1. A meat mincing machine comprising a dish rotatable about a vertical axis, a horizontal knife shaft with a part thereof extending over the dish and having a uniform circular cross section, means for effecting rotation of the dish and the knife shaft, a collar and a nut spaced from one another on said shaft, counter-rings between the collar and the nut and adjacent the collar and the nut respectively, a plurality of hub rings journaled on the shaft between the counter-rings and having adjacent to faces of the counter-rings clamping faces which are of stepped screw thread-like form and are complementary to said faces of the counter-rings, a plurality of mincing knives secured to the hub rings and extending radially outwards with a generally screw-like inclination, and a dish cover pivotable relatively to the dish to partly overlie the mincing knives, said counter-rings and hubs being automatically clamped against said nut due to counter-torque on the knives during operation of the machine.

2. A machine as set forth in claim 1, wherein at least one hub ring of the knives that is first encountered by material to be minced and the counter-ring adjacent said one hub ring have adjoining faces upon which the screw-like stepped faces are disposed, the counter-ring having stepped faces which descend axially, and the one hub ring having stepped faces which ascend axially, in the direction of rotation.

3. A meat mincing machine comprising a dish rotatable about a vertical axis, a horizontal knife shaft with a part thereof extending over the dish and having a uniform circular cross section, means for effecting rotation of the dish and the knife shaft, a collar and a nut spaced from one another on said shaft, counter-rings between the collar and the nut and adjacent the collar and the nut respectively, a plurality of hub rings journaled on the shaft between the counter-rings and having adjacent to faces of the counter rings clamping faces which are of stepped screw thread-like form and are complementary to said faces of the counter-rings, a plurality of mincing knives secured to the hub rings and extending radially outwards with a generally screw-like inclination, and a dish cover pivotable relatively to the dish to partly overlie the mincing knives, said counter-rings and hubs being automatically clamped against said nut due to counter-torque on the knives during operation of the machine, the knives including longitudinal recesses with angled cutters at the rear edges of these recesses in the direction of rotation of the knives.

4. A machine as set forth in claim 3, wherein the angled cutters of all the knives except the last encountered by material to be minced are directed towards the input side of the material to be minced whereas the angled cutters of the last knives are directed towards the output side.

5. A meat mincing machine comprising a dish rotatable about vertical axis, a horizontal knife shaft with a part thereof extending over the dish and having a uniform circular cross section, means for effecting rotation of the dish and the knife shaft, a collar and a nut spaced from one another on said shaft, counter-rings between the collar and the nut and adjacent the collar and the nut respectively, a plurality of hub rings journaled on the shaft between the counter-rings and having adjacent to faces of the counter rings clamping faces which are of stepped screw thread-like form and are complementary to said faces of the counter-rings, a plurality of mincing knives secured to the hub rings and extending radially outwards with a generally screw-like inclination, and a dish cover pivotable relatively to the dish to partly overlie the mincing knives, said counter-rings and hubs being automatically clamped against said nut due to counter-torque on the knives during operation of the machine, the hub rings being divided by separating planes, one of said separating planes being provided with an axial guide groove and the other with at least one projection fitting into the guide groove to give a flush connection.

6. A machine as set forth in claim 5, wherein the separating plane passes through the center of the hub rings to divide the hub rings into two segments extending over an arc of 180°.

7. A meat mincing machine comprising a dish rotatable in a horizontal plane, a horizontal knife shaft including knife sets thereon and rotatably mounted within said dish in a plane perpendicular to the plane of rotation of said dish, a hinged cover partially overlying said dish, said knife sets including wing-like disposed blades secured on hubs, said hubs being removably received on said knife shaft, counter-rings on said knife shaft at opposite ends of said hubs, a collar on said shaft engaging one of said counter-rings, a clamp nut on the terminal end of said shaft to retain the hubs and counter-rings in assembled relation on said shaft, the hub rings and the counter-rings being provided at their adjacent faces with stepped faces complementary to each other and fitting into each other and ascending generally in screw-thread fashion, at least the hub ring of the knife set first encountered by the material to be minced having screw thread-like extending stepped faces ascending in the direction of rotation and the adjacent counter-ring has screw thread-like extending stepped faces descending in the direction of rotation, both stepped faces mutually and automatically engaging due to the counter-torque during operation.

References Cited in the file of this patent

UNITED STATES PATENTS

| | | |
|---|---|---|
| 1,488,250 | Hottman | Mar. 25, 1924 |
| 1,994,051 | Scharnberg | Mar. 12, 1935 |

FOREIGN PATENTS

| | | |
|---|---|---|
| 2,216 | Sweden | June 18, 1890 |